United States Patent
Dombeck

(10) Patent No.: US 6,228,497 B1
(45) Date of Patent: May 8, 2001

(54) HIGH TEMPERATURE RESISTANT GLASS FIBER COMPOSITION AND A METHOD FOR MAKING THE SAME

(75) Inventor: Russell Allen Dombeck, Salem, WI (US)

(73) Assignee: USG Interiors, Inc., Chicago, IL (US)

( * ) Notice: Subject to any disclaimer, the term of this patent is extended or adjusted under 35 U.S.C. 154(b) by 0 days.

(21) Appl. No.: 08/999,528

(22) Filed: Jan. 13, 1998

(51) Int. Cl.⁷ ........................................ B32B 9/00
(52) U.S. Cl. ........................ 428/392; 428/372; 428/378; 428/921
(58) Field of Search ................. 428/297.4, 372, 428/392, 921, 378; 524/492, 568, 847; 252/602

(56) References Cited

U.S. PATENT DOCUMENTS

| | | | |
|---|---|---|---|
| 3,220,915 | 11/1965 | Shannon | 161/149 |
| 3,248,257 | 4/1966 | Cadotte et al. | 117/126 |
| 3,348,994 | 10/1967 | Rees et al. | 161/170 |
| 4,225,649 | * 9/1980 | Peterson | 428/323 |
| 4,611,445 | 9/1986 | Pressley | 52/144 |
| 4,690,859 | * 9/1987 | Porter et al. | 428/251 |
| 5,134,179 | 7/1992 | Felegi, Jr. et al. | 524/13 |
| 5,250,153 | 10/1993 | Izard et al. | 162/152 |

* cited by examiner

Primary Examiner—William Krynski
Assistant Examiner—J. M. Gray
(74) Attorney, Agent, or Firm—John M. Lorenzen; Robert H. Robinson

(57) ABSTRACT

A high temperature resistant glass fiber composition consists essentially of glass fibers having a nominal softening point of about 1000° F. (about 538° C.) which is capable of passing the British Standard 476 Part 4 fire test for building materials. The BS476-4 test begins at 750° C., substantially above the nominal softening point of the glass fibers. The increased temperature resistance is provided by coating the glass fibers with a halogenated resin latex binder and a calcium carbonate material. The method of making the glass fiber composition comprises depositing the resin latex and a calcium carbonate material on the glass fibers using a cationic flocculant. The preferred halogenated resin latex binder is selected from polyvinyl chloride and polyvinylidene chloride.

9 Claims, No Drawings

HIGH TEMPERATURE RESISTANT GLASS FIBER COMPOSITION AND A METHOD FOR MAKING THE SAME

BACKGROUND OF THE INVENTION

1. Field of the Invention

This invention relates to a glass fiber composition that will withstand the high temperatures required for a fire-rated product such as an acoustical ceiling tile, wall insulation material, or an interior wall sheathing product. It is well known that conventional mineral fibers prepared by attenuating a molten stream of basalt, slag or other, vitreous mineral constituent can be formulated to withstand melting at temperatures of about 1500° F. (815° C.). In addition, special additives can be incorporated into glass fibers to increase their melting point, but these special glass fibers are very expensive. Even mineral wool products may exhibit some softening distortion and shrinkage as temperatures approach 1500° F. (815° C.). Clay fillers, e.g. kaolin clay, are frequently incorporated in mineral wool products to improve their fire resistance.

Conventional glass fibers have a nominal "softening point" of about 1000° F. (about 538° C.) and are generally considered to be unsuitable for formulating firerated products. It has now been discovered that the incorporation of calcium carbonate (limestone) or calcium magnesium carbonate (dolostone) in combination with a halogenated resin binder causes a reaction with the surface of the glass fibers at high temperatures which increases the resistance of the glass fibers to high temperatures. Carbonate-containing glass fiber compositions have been formulated which are capable of passing the ASTM E-136 or the British Standard 476, Part 4 non-combustibility tests.

2. Description of the Prior Art

The water-felting of dilute aqueous dispersions of mineral wool is a well known process for manufacturing panel products such as acoustical ceiling tiles and wall insulation panels. In the process, a dispersion of mineral wool, a binder and other ingredients are flowed onto a moving foraminous wire screen, such as an Oliver or Fourdrinier mat forming machine, for dewatering. The wet mat is first dewatered by gravity and then vacuum suction is applied. The wet mat is dried in heated convection drying ovens, and the product is cut and, if desired, top coated with paint to produce structural panels for use as acoustical ceiling files or sheathing.

U.S. Pat. No. 5,134,179 discloses a composite fiberboard comprising inorganic fibers (mineral wool or glass fibers), perlite, clay and cellulosic fibers as the primary ingredients with a latex binder containing extender particles. Calcium carbonate and magnesium carbonate are disclosed as extender particles. The latex binder and extender particles are deposited upon the cellulosic fibers. There is no teaching in this patent that the products are fire-rated or that there is any reaction between the extender particles and the inorganic fibers. In fact, there are no operating examples disclosing the use of glass fibers.

U.S. Pat. No. 3,220,915 discloses glass fibers which have resistance to high temperature provided by several oxide ingredients, including calcium oxide, incorporated into the fiber-forming composition. The fibers produced from the melt are semi-crystalline and are resistant to high temperatures.

U.S. Pat. No. 3,248,257 discloses flame-resistant mineral fiber tiles prepared from slag wool wherein the fibers are treated with an aqueous chemical composition to provide a heat-resistant refractory coating on the fibers. Several chemicals may be used to provide the heat-resistant coating, however, there is no teaching that a carbonate can be used. The patent discloses that glass fibers are not very reactive with the chemical composition, and in fact, practically inert in the process of producing the treated tile. It further teaches that whether there is a reaction at red heat is not material to the invention.

U.S. Pat. No. 5,250,153 discloses a method for manufacturing a mineral wool panel wherein an anionic resin latex binder is deposited on the mineral fiber by means of a cationic flocculant. There is a disclosure that a limestone filler can be incorporated into the composition, however, there is no teaching that the limestone filler reacts with the mineral fiber to increase its fire resistance.

U.S. Pat. No. 4,611,445 discloses a ceiling panel resistant to sag when exposed to a fire comprising mineral wool fibers and lithium carbonate. The patent discloses that the devitrification action of the lithium carbonate is specific to mineral wool fibers. It also discloses that lithium carbonate in combination with glass fibers reduces the fusion and melting temperature resulting in earlier shrinkage.

U.S. Pat. No. 3,348,994 discloses a glass fiber board product which contains a silicate devitrifying agent and a devitrification accelerator (e.g. titania or magnesium carbonate). As stated in this patent, the invention is concerned with the use of asbestine or an equivalent silicate to cause relatively rapid devitrification of glass fibers.

SUMMARY OF THE INVENTION

It has been discovered that a high temperature resistant glass fiber composition can be produced by incorporating a calcium carbonate additive into the composition. Conventional glass fibers having a "softening point" of about 1000° F. (about 538° C.) can be formulated into fire-rated products by incorporating a calcium carbonate additive into intimate contact with the glass fiber surface in combination with a halogenated resin binder. When the glass fiber composition is formed into a panel or tile product, starch may also be used in combination with the halogenated resin to bond the fibers. These halogenated resin binders are readily combustible and cause very high temperatures In the product when subjected to fire-rating tests such as ASTM E-136 or British Standard 476, Part 4. However, the high temperature caused by the combustion of the binder decomposes the calcium carbonate or calcium magnesium carbonate to form calcium oxide and carbon dioxide. The calcium oxide will react with the surface of the glass fibers at the high temperatures to change the surface chemistry of the glass fibers by forming crystalline silicate compounds. These silicate compounds on the surface of and/or throughout the glass fibers provide the high temperature resistance. It has been found that other resin binders, such as polyvinyl acetate, do not provide a uniform reaction between the glass and the carbonate.

It is an object of this invention to provide a conventional glass fiber product having high temperature resistance sufficient to pass fire-rating tests such as ASTM E-136 or British Standard 476-4.

It is another object of this invention to provide a method for making glass fiber products wherein a calcium carbonate compound is uniformly deposited in intimate contact with the glass fiber surface.

The above objects, and others which will become more apparent from the description which follows, are accomplished in accordance with the preferred method by forming a dilute aqueous dispersion of glass fibers, calcium carbonate and/or calcium magnesium carbonate and an anionically-stabilized halogenated resin latex binder. These ingredients are mixed to form a homogeneous mixture, and near the end of mixing, an effective amount of a cationic flocculant is added.

The aqueous dispersion, including the flocculant, is passed to a moving drainage wire screen, such as an Oliver or Fourdrinier mat forming machine, for dewatering. The flocculant acts as a coupling agent for the latex binder and the calcium carbonate and/or calcium magnesium carbonate which become coupled or bound to the surface of the glass fibers. After removal of the drainage water, the still wet mat is further dried by passing large volumes of heated air through it. Depending upon the amount of various additives which may be incorporated into the aqueous dispersion, the dried panel products may have densities ranging from about 5 to about 20 pounds per cubic foot or more. In addition to the preferred method employing a flocculent, the halogenated resin may also be incorporated into a previously formed glass fiber mat by vacuum drawing it into the mat.

DESCRIPTION OF THE PREFERRED EMBODIMENTS

The fiber material for use in this invention is conventional glass fiber having a "softening point" of about 1000° F. (about 538° C.). For example, a glass fiber material herein referred to as Knauf Glass Wool was analyzed by X-ray fluorescence spectroscopy for oxide content with the following results:

| | |
|---|---|
| Ca O | 10.07 |
| Mg O | 3.17 |
| $Al_2O_3$ | 3.19 |
| Si $O_2$ | 60.55 |
| $Fe_2O_3$ | 0.10 |
| $Na_2O$ | 13.75 |
| $K_2O$ | 0.64 |
| Ti $O_2$ | 0.01 |
| Mn O | <0.01 |
| $P_2O_5$ | <0.01 |
| Sr O | 0.01 |
| S $O_3$ | 0.09 |
| $B_2O_3$ | 8.00 |
| Lost on Ignition (500° C.) | 0.27 |
| Lost on Ignition (1000° C.) | |
| Total | 100.29 |

Expressed in terms of dry solids content in the dried panel product, the glass fibers may be present in an amount up to about 80% by weight It is preferred that the glass fiber content range from about 30% to about 65% by weight.

The latex binder used in this invention may be any commercially available halogenated resin latex, which should be anionically-stabilized if used in combination with a cationic flocculant. The preferred latexes are chlorinated resins such as polyvinyl chloride and polyvinylidene chloride. Polyvinyl chloride (PVC) is the preferred binder. Other latexes such as polyvinylidene chloride may be used to impart additional fire resistance, however, the soft nature of this type of latex limits the amount that can be used in combination with the PVC. In order to pass the 90° F./90% RH sag test for ceiling tiles, the preferred latex should have a Tg above 32° C. (90° F.)

In addition to the latex binder, a starch may be used as a co-binder to reduce the high cost of the latex, but its flammability makes it more difficult to pass the BS 476-4 test. A viscous starch dispersion should not be used, for it interferes with the flow-through drying process. A starch co-binder may also improve the strength and hardness of the product. Suitable starches include pearl starch or wheat starch.

The latex binder solids may be present in the final product on a dry weight basis in an amount ranging from about 1% to about 25% depending upon the amount of the glass fiber, calcium carbonate or calcium magnesium carbonate and other ingredients which may be present, as well as the desired properties. In general, from about 2% to about 15% is preferred.

In order to achieve the objectives of this invention, finely ground calcium carbonate (limestone) or calcium magnesium carbonate (dolostone) is added to the aqueous dispersion. When subjected to high temperatures, such as caused by the combustion of the latex binder, the calcium carbonate or calcium magnesium carbonate decomposes to form calcium oxide and carbon dioxide. The calcium magnesium carbonate is preferred because of its lower decomposition temperature. The ground carbonate has a particle size in the range of about 5–25 microns diameter. The carbonate may be present in amounts ranging from about 30% to about 65% by weight of the final product. In general, it will not be necessary to use more ground carbonate by weight than the weight of the glass fibers.

Though not used in large amounts, a key processing aid for the preferred method is a cationic flocculant that has a positive charge. When the flocculent contacts the negatively charged glass fiber, an electrostatic interaction occurs which bonds the flocculant to the surface of the glass fibers. The excess positive charge on the flocculant causes the anionic-stabilized, halogenated resin latex binder and the calcium carbonate or calcium magnesium carbonate to be deposited onto the surface of the glass fibers. In this method, there is excellent retention of the calcium carbonate or calcium magnesium carbonate and the latex binder on the surface of the glass fibers. As a result, the calcium carbonate or calcium magnesium carbonate is uniformly placed on the surface of the glass fibers so that when exposed to very high temperatures, the calcium oxide formed by the decomposition of the carbonate can react with the surface of the glass fibers to form crystalline silicate compounds. These silicate compounds are resistant to high temperatures thereby reducing shrinkage and distortion in the glass fiber product.

Cationic flocculants useful in this invention should have at least 5 mole percent of a cationic component A polyacrylamide having at least 10 mole percent of a cationic component is a preferred flocculant. Examples of suitable cationic flocculants are polyacrylamides sold under the trademarks CYTEC 91, PERCOL 292, BETZ 1266 and CYANAMIDE E 1901. Other cationic flocculants useful herein are polyamines sold under the trademarks BETZ 1181, CYPRO 516 and HENKEL SC 5062. A cationic guar gum derivative (GENDRIV 162) may also be used.

Depending upon the particular cationic flocculent and the latex binder used to carry out the method of this invention, the amount of flocculant to achieve substantially complete deposition of the binder and the calcium carbonate or calcium magnesium carbonate on the surface of the glass fibers may vary. A flocculant amount between about 1% and about 4% solids based on the weight of the latex resin solids provides good retention of the binder and the carbonate. In general, the flocculant may range from about 0.1% to about 15% by weight based on the binder resin solids. In normal practice, the cationic flocculant will be diluted to about 0.04%–0.2% by weight active ingredients prior to its incorporation into the aqueous dispersion of glass fibers and latex binder.

Other ingredients may also be incorporated into the glass fiber composition. Clays such as kaolin or ball clay are frequently added to inorganic fiber products to improve fire resistance. Flame retardants such as zinc borate and aluminum trihydrate may be used to suppress the flame which may result from the combustion of the latex or starch binder. Stucco (calcined gypsum) may be used as a processing aid to destabilize the latex binder to allow it to be more easily flocculated. The stucco is generally used in amounts below its solubility level and therefore should be present in the final product only in trace amounts. Additional ingredients may include dyes, pigments, antioxidants, surfactants, water repellents and fillers. These are conventional additives, but their use must be carefully limited so as not to interfere with the deposition of the latex binder and the calcium carbonate on the glass fibers.

The preferred method of this invention comprises forming an aqueous dispersion of glass fiber at a concentration ranging from about 1.5% to about 6% by weight. The glass fibers have a "softening pointy" of about 1000° F. (about 538° C.). A commercial anionically-stabilized latex such as polyvinyl chloride is added to the glass fiber slurry. Finely ground calcium carbonate or calcium magnesium carbonate is added to the slurry alone or in combination with other fillers such as clay The order in which the ingredients are added to the aqueous dispersion may be varied, and in order to facilitate mixing, it may be preferable to add the glass fibers after the other ingredients have been thoroughly blended in the aqueous dispersion. Of course, there is further mixing after all of the ingredients are added to the aqueous dispersion in order to form a homogeneous mix.

After mixing for several minutes, an appropriate cationic flocculating agent such as a polyacrylamide is added to the mix. When manufactured under plant conditions, the flocculant is injected into the stock delivery system prior to depositing the furnish on a screen for dewatering. The flocculating agent insures that the latex binder and the calcium carbonate or calcium magnesium carbonate are uniformly deposited onto the glass fiber. After flocculation is complete, the slurry is poured or pumped onto a moving foraminous wire screen to form a wet mat, with dewatering first under gravity and then under vacuum. Finally, hot air at about 350° F. to 425° F. (about 175° C. to about 220° C.) is passed through the mat until it is fully dried.

The following specific examples illustrate specific embodiments of this invention. Unless otherwise noted, all amounts are expressed as parts by weight on a dry solids total weight basis.

EXAMPLE 1

Knauf glass fiber was investigated to determine its melting point. However, an exact melting point could not be determined, probably due to the fact that glass is a supercooled liquid and only distinct phase changes can be measured.

Approximately 5 grams of Knauf glass fiber was placed in a muffle furnace, and the following observations were made:
1. At 500° C., after about 15 minutes, there is no visible change in the glass fiber which, after cooling, feels similar to the unheated fiber.
2. At 550° C., there is still no visible change but the material becomes stiff and inflexible on cooling.
3. At 600° C., the material begins to shrink.
4. At 650° C., after 15 minutes, the glass fibers appear almost fully fused into an irregularly shaped mass about 1 inch in diameter.

It should be noted that the British Standard 476-4 test begins at 750° C.

British Standards 476, Part 4 Fire Test for Building Materials

The British Standard 476-4 test specifies a method for determining whether building materials are non-combustible within the meaning of the definition. Materials used in the construction and finishing of buildings are classified "combustible" or "non-combustible" according to their behavior in this test. The definitions given in British Standard 4422 apply to this test.

Three specimens shall be prepared, each with the following dimensions:

| | |
|---|---|
| width and breadth | 40 mm ± 2 mm |
| height | 50 mm ± 3 mm |
| volume | 80 cm$^3$ ± 5 cm$^3$ |

If the thickness of the material is less than the height as specified above, each specimen shall be made of a sufficient number of layers to achieve this thickness. These layers shall occupy a horizontal position in the specimen holder and shall be held together firmly, without compression, by means of fine steel wires to prevent air gaps between layers. The density of the specimen shall be representative of the density of the material.

Before test, the specimens shall be dried in a ventilated oven at 60° C.±5° C. for 24 hours and then cooled to ambient temperature in a desiccator containing anhydrous calcium chloride.

The apparatus shall be a tubular electric furnace comprising a tube of refractory material of a density between 1500 and 2000 kg/m$^3$, an internal diameter of 75 mm, a height of 150 mm and an overall wall thickness between 10 and 13 mm. The furnace shall be located within an Insulated surround, and before commencement of a test, it is necessary to ensure that the air stabilizer is internally clean.

The stabilizer is a cone-shaped, airflow device attached to the underside of the furnace. It is made of sheet steel, about 1 mm thick, is 500 mm long and reduces from a 75 mm internal diameter at the top to a 9 mm internal diameter at the lower end. At the joint with the furnace, it should be a close, airtight fit and finished smooth internally. At the open top of the furnace, a draught shield is provided, made of the same material as the stabilizer, with an internal diameter of 75 mm and a height of 50 mm.

The electric winding of the furnace shall be so arranged that a vertical zone of at least 60 mm length in the central part of the empty furnace maintains the operating temperature, uniform to within ±5° C. as measured by the thermocouple located 10 mm from the wall. This uniformity can be achieved either by having closer winding at the two ends of the furnace tube or by means of separate windings at the two ends regulated independently of the central section. To minimize temperature fluctuations in the furnace it is necessary to use a voltage stabilizer in the circuit able to maintain voltage within ±0.5% of the nominal value.

The specimen shall be placed in a holder made of nichrome steel wire of 1.0–1.5 mm diameter with a fine metal gauze tray of heat resisting steel placed in the bottom of the nichrome wire holder. The weight of the holder assembly should not exceed 20 g. This holder shall be suspended from the lower end of an adjustable tube of heat resisting steel, which has an outside diameter of approximately 6 mm and an internal diameter of 2 mm. The specimen insertion device shall consist essentially of a metallic rod moving freely in a vertical tube fitted to the side of the furnace. This device shall be so designed and operated that the specimen is inserted into the furnace quickly and without any mechanical shock During the test, the specimen holder shall occupy a predetermined position in the furnace, in the middle of the constant temperature zone and equidistant from the walls.

Thermocouples for temperature measurement shall be of the shielded type, having an external diameter not exceeding 1 mm and with chromel/alumel thermocouple elements of a diameter not exceeding 0.2 mm. The furnace thermocouple shall be located in its correct position by means of small steel spacers attached to the top and bottom edges of the draught shield and having 2.5 mm diameter holes. For temperature determination it is desirable to use a temperature recorder, e.g. 1000° C. range, which will give a continuous measurement during the test.

The test is carried out in the above-described furnace. The furnace temperature is measured by the thermocouple positioned so that its hot junction is 10 mm from the wall of the furnace and at mid-height of the specimen. A second thermocouple is placed in the center of the specimen, inserted from the top through a 2 mm diameter hole. This shielded thermocouple shall maintain contact with the material at the bottom.

The furnace shall be heated and its temperature stabilized at 750° C.±10° C. for a minimum period of 10 minutes. The specimen is then inserted in the furnace, with the insertion completed in 5 seconds or less. Temperatures are then recorded for a 20 minute period, noting the occurrence and duration of any flaming in the furnace. The stabilized heating current is maintained unchanged during the test.

The material shall be deemed non-combustible if, during the test, none of the three specimens either:

(1) causes the temperature reading from either of the two thermocouples to rise by 50° C. or more above the initial furnace temperature, or (2) is observed to flame continuously for 10 seconds or more inside the furnace.

Otherwise, the material shall be deemed combustible.

EXAMPLE 2

The following formulation was tested using the British Standard 476 Part 4 testing device and protocols:

| Ingredient | Amount (dry solids) | Wt. % |
|---|---|---|
| Knauf Glass Fiber | 250 gms. | 46.46 |
| Calcium Magnesium Carbonate (Dolocron 4512) | 250 gms | 46.46 |
| PVC Latex (Vycar 460 × 104) | 26.9 gms. | 5 |
| Zinc Borate (Firebrake ZB) | 10.8 gms. | 2 |
| Polyacrylamide (Cytec 91) | 0.4 gms | 0.07 |
| | | 99.99 |
| Stucco | 18 gms. | |

Eighteen grams of stucco was mixed into 14,000 milliliters of water for 2 minutes. The calcium carbonate, zinc borate, PVC latex binder and glass fiber were added to the dispersion and mixed for 6 minutes. Then the polyacrylamide flocculent was added to the fiber glass slurry and there was further mixing for 30 seconds. After mixing was completed, the slurry was poured into a Tappi box and a full vacuum applied to dewater the wet mat in the box. The dewatered mat was left in the Tappi box where hot air at 330° F. was passed through the mat for complete drying.

Two samples were tested in accordance with British Standard 476-4. The material is considered to pass BS476-4 if neither the furnace temperature nor the sample temperature rise more than 50° C. above their starting temperatures and there is no more than 10 seconds of flaming.

| Sample | Initial Furnace Temp. | Peak Furnace Temp. | Peak Sample Temp. | Furnace Temp. Rise | Sample Temp. Rise | Flaming Time (sec.) |
|---|---|---|---|---|---|---|
| A | 750 | 788 | 734 | 38 | −16 | 0 |
| B | 748 | 786 | 737 | 38 | −11 | 0 |

These samples easily passed BS476-4. There was no flaming of the samples. The negative values under "Sample Temp. Rise" are due to the strong endothermic decomposition of the calcium magnesium carbonate which begins to decompose at about 730° C.

In carrying out the method, it should be noted that the stucco was added to the water in an amount below its solubility level and is used only to destabilize the latex binder to facilitate flocculation. The zinc borate was added as a flame suppressant and is not a factor in the calcium carbonate reaction with the glass fiber.

Dimensional stability was determined as follows:
Sample A
Before Test Dimensions: 40.10 mm×39.75 mm×49.35 mm at 18.79 grams
After Test Dimensions: 39.05 mm×38.40 mm×48.50 mm at 14.09 grams
Percent Change: 2.62% 3.40% 1.72% 25.03%
Sample B
Before Test Dimensions: 40.20 mm×39.70 mm×49.40 mm at 19.75 grams
After Test Dimensions: 39.05 mm×38.45 mm×48.50 mm at 14.88 grams
Percent Change: 2.86% 3.15% 1.82% 24.65%

The weight loss was due to both the latex binder loss and the loss of carbon dioxide during the decomposition of the calcium magnesium carbonate.

EXAMPLE 3

A pilot line run was made using the following formulations:

| Ingredient | Wt. % | Amount (lbs) |
|---|---|---|
| Knauf Glass Fiber | 61.4 | 66.0 |
| PVC Latex (Goodrich 460 × 6) | 7.7 | 8.3 |
| Calcium Magnesium Carbonate (Dolocron 4512) | 30.7 | 33.0 |
| Polyacrylamide (PERCOL 292) | 0.1 | 0.1 |
| | | 107.4 |

The glass fiber, PVC latex binder and calcium magnesium carbonate were added to 570 gallons of water to form an aqueous dispersion consisting of 2.20% solids. This is approximately 1.35% glass fiber solids. 45 gallons of flocculant (polyacrylamide) solution were prepared at a concentration of 0.1% solids, but less than 20 gallons were used in completing the run. Initially, stucco (5.5 lbs.) was added at the start of the mixing to destabilize the PVC latex. The flocculation was completed with crystal clear white water being produced. Formation of the glass fiber mat near the head box appeared uniform.

After dewatering on the foraminous screen, the wet mat was passed to an oven for flow-through drying by passing hot air through the mat. The initial temperature of the hot air was set at 390° F. (about 200° C.) which was maintained for about 30% of the run. A slight yellowing of the dried board was noted, and the temperature was reduced to 370° F. (about 185° C.) for approximately the next 25% of the run. The temperature was further reduced to 350° F. (about 175° C.) for another 25% of the run, and finally to 330° F. (about 165° C.) for the remainder. The board was fully dried even at the lower temperatures which did improve the whitening of the board. 17 panels were cut from the dried board, and all panels were 48.35 inches by 24.65 inches. The following physical data was recorded:

| Board No. | Weight (gms.) | Avg. Thickness (inches) | Density(PCF) |
|---|---|---|---|
| 1 | 2125 | 1.12 | 5.97 |
| 2 | 2120 | 1.10 | 6.06 |
| 3 | 2130 | 1.10 | 6.11 |
| 4 | 2130 | 1.10 | 6.09 |
| 5 | 2130 | 1.08 | 6.24 |
| 6 | 2150 | 1.06 | 6.42 |
| 7 | 2300 | 1.11 | 6.52 |
| 8 | 2250 | 1.12 | 6.37 |
| 9 | 2200 | 1.10 | 6.29 |
| 10 | 2150 | 1.07 | 6.36 |
| 11 | 2100 | 1.05 | 6.31 |
| 12 | 2060 | 1.03 | 6.29 |
| 13 | 2045 | 1.00 | 6.43 |
| 14 | 2030 | 1.00 | 6.42 |
| 15 | 2035 | 1.03 | 6.25 |
| 16 | 2100 | 1.06 | 6.25 |
| 17 | 2080 | 0.97 | 6.76 |

The average density was 6.27 pcf with a standard deviation of 0.17 pcf. This was an unexpectedly low board density. The average modulus of rupture under 3 point loading for both machine and cross machine direction samples was 52.2 psi. Despite their extremely lightweight and only one inch thickness, the panels had good handleability.

There were no fire tests performed on these panels.

Having completely described the glass fiber compositions and the method of this invention in accordance with 35 U.S.C. 112, what is claimed is:

1. A high temperature resistant glass fiber product consisting essentially of glass fibers having a nominal softening point of about 1000° F. (about 538° C.), the surface of said glass fibers being coated with a halogenated resin latex binder and a calcium carbonate material which reacts with the surface of the glass fibers at high temperatures to form crystalline silicate compounds, whereby said glass fiber product is capable of passing the British Standard 476 Part 4 fire test for building materials.

2. The product of claim 1 wherein the halogenated resin latex binder is a chlorinated resin.

3. The product of claim 2 wherein the chlorinated resin is selected from polyvinyl chloride and polyvinylidene chloride.

4. The product of claim 3 wherein the calcium carbonate material ranges from about 30% to about 65% by weight of the product.

5. The product of claim 3 wherein the calcium carbonate material is selected from calcium carbonate and calcium magnesium carbonate.

6. The product of claim 3 wherein the latex binder ranges from about 2% to about 15% by weight of the product.

7. The product of claim 3 wherein the calcium carbonate material is calcium magnesium carbonate and ranges from about 30% by weight of the product up to an amount equal to the weight of the glass fiber.

8. The product of claim 3 wherein the calcium carbonate material is calcium magnesium carbonate.

9. The product of claim 3 wherein the glass fiber content ranges from about 30 to about 65% by weight.

* * * * *